(12) United States Patent
Tarkoma et al.

(10) Patent No.: US 12,247,886 B2
(45) Date of Patent: Mar. 11, 2025

(54) SENSOR CALIBRATION (71) Applicant: University of Helsinki, Helsingin Yliopisto (FI)

(72) Inventors: Sasu Tarkoma, Helsingin Yliopisto (FI); Tuukka Petäjä, Helsingin Yliopisto (FI); Markku Kulmala, Helsingin Yliopisto (FI); Joni Kujansuu, Helsingin Yliopisto (FI)

(73) Assignee: University of Helsinki, Helsingin Yliopisto (FI)

( * ) Notice: Subject to any disclaimer, the term of this patent is extended or adjusted under 35 U.S.C. 154(b) by 619 days.

(21) Appl. No.: 16/976,194

(22) PCT Filed: Mar. 22, 2019

(86) PCT No.: PCT/FI2019/050242
§ 371 (c)(1),
(2) Date: Aug. 27, 2020

(87) PCT Pub. No.: WO2019/180325
PCT Pub. Date: Sep. 26, 2019

(65) Prior Publication Data
US 2021/0003461 A1 Jan. 7, 2021

(30) Foreign Application Priority Data
Mar. 22, 2018 (FI) .................................. 20185271

(51) Int. Cl.
*G01K 15/00* (2006.01)
*G08C 23/00* (2006.01)
(52) U.S. Cl.
CPC ........... *G01K 15/005* (2013.01); *G08C 23/00* (2013.01)

(58) Field of Classification Search
CPC .............................. G01K 15/005; G08C 23/00
(Continued)

(56) References Cited

U.S. PATENT DOCUMENTS 5,386,373 A * 1/1995 Keeler ............... G01N 33/0075
700/266
5,832,411 A * 11/1998 Schatzmann ...... G01N 33/0075
702/30
(Continued)

FOREIGN PATENT DOCUMENTS

CN 1348541 A 5/2002
CN 101784894 A * 7/2010 ....... G01N 33/48771
(Continued)

OTHER PUBLICATIONS

16976194_2024-02-08_WO_2014206618_A1_H.pdf,Dec. 31, 2014.*
(Continued)

*Primary Examiner* — Gail Kaplan Verbitsky
(74) *Attorney, Agent, or Firm* — Espatent Oy (57) ABSTRACT

A method and apparatus are disclosed for calibrating a first sensor in a changing operating environment by a calibration process. Sensor data are received from the first sensor and sensor values are received from a known calibrating sensor. A sensor specific model is maintained for the first sensor. Calibration needs are detected by estimating a drift and an error, taking into account a difference of sensor values to the known calibrating sensor and further taking into account a sensor profile of the first sensor. A correction factor or a correction model is estimated to the sensor data using said difference and used for calibrating the sensor. The correction factor or the correction model is derived from the sensor specific model.

20 Claims, 5 Drawing Sheets

(58) Field of Classification Search
USPC .......................................................... 702/99
See application file for complete search history.

(56) References Cited

U.S. PATENT DOCUMENTS

| | | | | |
|---|---|---|---|---|
| 5,857,777 | A * | 1/1999 | Schuh | G01K 15/00 374/170 |
| 6,086,248 | A * | 7/2000 | Paul | G01K 7/42 374/102 |
| 6,149,298 | A * | 11/2000 | Kraus | G01J 5/08 374/E13.003 |
| 6,179,785 | B1 * | 1/2001 | Martinosky | G01J 5/04 600/549 |
| 6,283,628 | B1 * | 9/2001 | Goodwin | G01K 15/00 374/1 |
| 6,298,137 | B1 * | 10/2001 | Hoffstein | H04L 9/3093 380/283 |
| 7,766,542 | B2 * | 8/2010 | Cunningham | F01N 13/009 60/272 |
| 8,040,232 | B2 * | 10/2011 | Oh | H04W 4/38 709/224 |
| 9,909,908 | B2 * | 3/2018 | Mrvaljevic | G01K 15/00 |
| 2006/0282225 | A1 | 12/2006 | Sunshine et al. | |
| 2007/0010930 | A1 * | 1/2007 | Wu | B60L 7/16 701/99 |
| 2007/0044539 | A1 * | 3/2007 | Sabol | G06Q 10/06 73/19.01 |
| 2008/0028778 | A1 * | 2/2008 | Millet | G06F 1/206 700/300 |
| 2009/0122826 | A1 * | 5/2009 | Liebmann | G01J 5/532 374/2 |
| 2010/0316086 | A1 * | 12/2010 | Engelstad | G01K 15/00 374/E7.004 |
| 2011/0021887 | A1 * | 1/2011 | Crivelli | A61B 5/02154 600/302 |
| 2011/0295427 | A1 * | 12/2011 | Motzer | B25J 9/162 700/258 |
| 2013/0166241 | A1 * | 6/2013 | Hamann | G06Q 10/06 702/99 |
| 2013/0173028 | A1 * | 7/2013 | Felty | G05B 13/02 700/79 |
| 2014/0140364 | A1 * | 5/2014 | Charles | G01K 15/005 374/178 |
| 2014/0278186 | A1 | 9/2014 | Herzl et al. | |
| 2015/0211836 | A1 * | 7/2015 | deVilliers | H01L 22/12 702/36 |
| 2016/0054458 | A1 * | 2/2016 | Blanpied | G01V 5/0016 250/252.1 |
| 2016/0091894 | A1 * | 3/2016 | Zhang | B64U 10/13 701/2 |
| 2016/0164975 | A1 * | 6/2016 | Seo | H04L 67/12 707/752 |
| 2017/0023430 | A1 | 1/2017 | Dormody et al. | |
| 2017/0060574 | A1 | 3/2017 | Malladi et al. | |
| 2017/0102251 | A1 * | 4/2017 | Masson | H04L 67/12 |
| 2017/0372601 | A1 | 12/2017 | Yamashita et al. | |
| 2019/0020721 | A1 * | 1/2019 | Chun | G08B 25/08 |
| 2019/0309701 | A1 * | 10/2019 | Klein | F02D 41/3854 |

FOREIGN PATENT DOCUMENTS

| | | | | |
|---|---|---|---|---|
| CN | 102393882 A | | 3/2012 | |
| CN | 103076034 A | | 5/2013 | |
| CN | 106864462 A | * | 6/2017 | ........ B60W 50/0205 |
| CN | 107532900 A | | 1/2018 | |
| DE | 102012219362 A1 | * | 6/2013 | ............ G01K 7/42 |
| EP | 2602752 A1 | | 6/2013 | |
| KR | 20010071235 A | * | 1/2007 | |
| WO | 2010099507 A1 | | 9/2010 | |
| WO | WO-2014206618 A1 | * | 12/2014 | ............ G01D 3/036 |
| WO | 2017062652 A2 | | 4/2017 | |
| WO | WO-2017184403 A1 | * | 10/2017 | ............ F25B 1/053 |

OTHER PUBLICATIONS

16976194_2024-02-08_CN_106864462_A_H.pdf16976194_Feb. 8, 2024.*
16976194_2024-07-25_CN_101784894_A_H.pdf,Jul. 21, 2010.*
16976194_2024-07-25_DE_102012219362_A1_H.pdf,Jun. 27, 2013.*
The Patent Office of the People's Republic of China, Notification of the First Office Action, Application No. 2019800190878, mailed Mar. 1, 2022, English Translation Attached, 2 pages.
The Patent Office of The People's Republic of China, Search Report, Application No. 2019800190878, mailed Feb. 22, 2022, 3 pages.
Notification of Transmittal of The International Search Report and The Written Opinion of The International Searching Authority, or The Declaration, Application No. PCT/FI2019/050242, Mailed May 31, 2019, 5 Pages.
Written Opinion of The International Searching Authority, Application No. PCT/FI2019/050242, Mailed May 31, 2019, 8 Pages.
Finnish Patent and Registration Office, Search Report, Application No. 20185271, Mailed on Feb. 24, 2020, 2 Pages.
Japan Patent Office, Notification of ground of rejection, Application No. 2020548943, mailed Sep. 28, 2022, 3 pages. English Translation, 2 pages.

* cited by examiner

SENSOR CALIBRATION

TECHNICAL FIELD

The present invention generally relates to sensor calibration.

BACKGROUND ART

This section illustrates useful background information without admission of any technique described herein representative of the state of the art.

Sensors usually produce a given output based on a measured property of something and according to a given behavior. As a simplified example, a temperature sensor may change electric resistance linearly within a given temperature range. The behavior of a thermistor can typically be modelled with a slope and offset i.e. using an equation of a line.

Some sensors such as a carbon monoxide sensor or radioactive dose sensors can be configured to compute a measure of aggregation or to integrate concentration of a measured property over time. Sometimes, the measured property and the output have a non-linear relationship. Also some sensors are less stable than normal thermistors in terms of their gain. Some sensors perform internal filtering, such as bandpass or high pass filtering to remove interference in which case some of the initial raw measurement data is irrevocably lost in the sensor.

Sensors are typically calibrated by exposing to different conditions in a standardized manner and by adjusting the sensor operation so as to achieve a desired sensor behavior. If the sensor comprises a digital circuitry, the calibration may simply be performed digitally by forming a desired transfer function to set desired output as a function of the measured property. It is envisioned that such digital calibration might also be distributed by performing a digital modification of the sensor values at an element other than the sensor, e.g. by a processing element downstream of the sensor.

In case of an analog sensor, the calibration can be performed by adding or reducing resistance coupled in series with the sensor or amplification of an output amplifier by adjusting bias of an amplifier transistor, for example. However, such standardized calibration necessitates either collecting sensors to a calibration station or moving a standardized calibration station to the sensors.

It is an object of the present invention to simplify calibration of sensors. It is another object of the present invention to enable more frequent calibration of sensors than before. It is a yet another object of the present invention to offer a technical alternative to existing techniques.

SUMMARY

According to a first example aspect there is provided a method comprising calibrating a first sensor in a calibration process that comprises:
receiving sensor data from the first sensor;
performing at least one of receiving sensor values from a known calibrating sensor; or maintaining a sensor specific model for the first sensor;
detecting calibration needs by estimating a drift and an error, taking into account a difference of sensor values to a known calibrating sensor or a sensor specific model and further taking into account any one or more of the operational environment of the sensor; the sensor profile; a sensor specific drift profile; and a sensor specific error profile; and
calibrating the sensor by estimating a correction factor or a correction model to the sensor data using said difference;
wherein the correction factor or the correction model is derived from the sensor specific model.

The method may further comprise that different sensors are hierarchically ranked and a hierarchical model is used to perform the calibrating of the first sensor with the calibrating sensor that is ranked higher in the hierarchical model.

The method may further comprise that.
a spatial model is maintained of one or more properties of a system for measuring which the first sensor is configured;
the spatial model is hierarchically used to perform derived calibration of the first sensor using measurements performed apart of the first sensor and subject to different conditions.

The method may further comprise that the spatial model integrates multiple air quality parameters. The spatial model may be connected to a regional air quality model for additional data source or data assimilation.

The method may further comprise that a plurality of sensors form groups of sensors communicating with each other. A multi-tier (e.g. two-tier) calibration may be performed inside a node and between nodes provide for improving accurate sensing capabilities. The sensor network may include moving sensors configured to transfer the calibration to stationary sensor networks from one or more reference observation sites.

The calibrating sensor may be a mobile sensor.

The calibrating sensor may be controlled by a remote controller. The remote controller may comprise a server computer. Alternatively, the remote controller may comprise a distributed functionality. The distributed functionality may be implemented by cloud computing. The remote controller may comprise an edge server positioned at an edge of a computer network.

The remote controller may perform runtime calibration of multiple sensors.

The calibrating sensor may be a virtual sensor based on a model of the sensor data provided by calibrated sensors. The virtual sensor data may be developed based on long-term sensor observables using a determined spatio-temporal data received from a sensor network.

The method may further comprise that proxy variables are incorporated from comprehensive observations and expanded via a network of sensors.

For example, $SO_2$, solar radiation and particulate matter may provide data on gas phase sulfuric acid concentration. New proxies may be developed via artificial intelligence and/or other data mining techniques.

The method may further comprise that a calibrated sensor is extended to an augmented virtual sensor that is configured to detect environmental properties beyond hardware specification of used at least one first sensor.

The extending of the calibrated sensor to the augmented virtual sensor may use the calibration model. The augmented virtual sensor may further use an environmental model. The environmental model may be produced by the remote controller.

According to a second example aspect there is provided a system implementing a distributed service in a cellular network, the system comprising:
remote controller; and a plurality of sensors communicatively connected to the remote controller;

wherein the remote controller and the plurality of sensors are configured to perform the method of the first example aspect.

According to a third example aspect there is provided a computer program comprising computer executable program code configured to cause, when executed, an apparatus to perform at least the method of the first example aspect.

The computer program may be stored on a memory medium. The memory medium may be a non-transitory memory medium.

According to a fourth example aspect there is provided an apparatus for calibrating a first sensor, the apparatus comprising:

means for receiving sensor data from the first sensor;

means for performing at least one of receiving sensor values from a known calibrating sensor; or maintaining a sensor specific model for the first sensor;

means for detecting calibration needs by estimating a drift and an error, taking into account a difference of sensor values to a known calibrating sensor or a sensor specific model and further taking into account any one or more of the operational environment of the sensor; the sensor profile; a sensor specific drift profile; and a sensor specific error profile; and means for calibrating the sensor by estimating a correction factor or a correction model to the sensor data using said difference;

wherein the correction factor or the correction model is derived from the sensor specific model.

Any foregoing memory medium may comprise a digital data storage such as a data disc, optical storage, magnetic storage, or opto-magnetic storage. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which.

DETAILED DESCRIPTION

In the following description, like reference signs denote like elements or steps.

Figure 1:
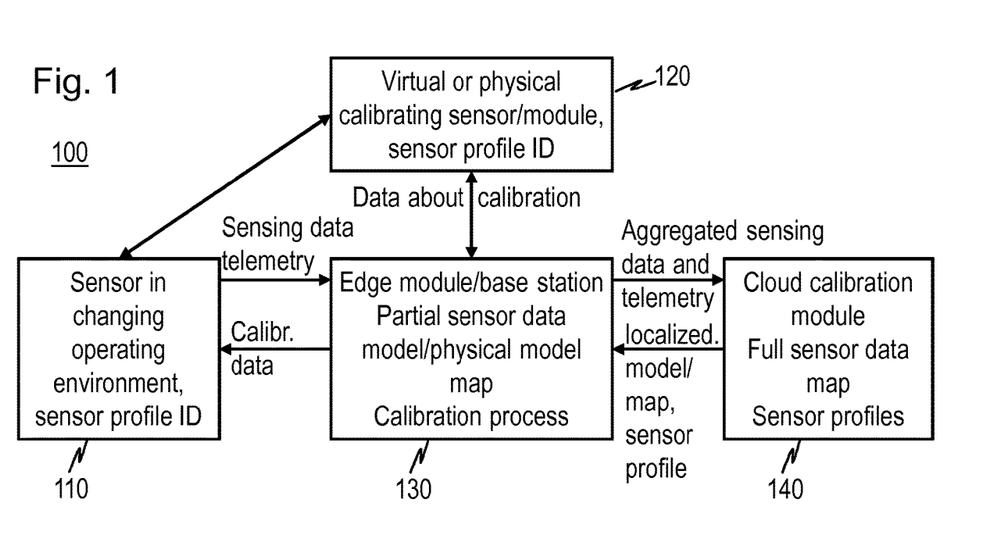
FIG. 1 shows a schematic drawing of a system according to an embodiment of the invention.

FIG. 1 shows a schematic drawing of a system 100 according to an embodiment of the invention. The system 100 comprises a first sensor 110 in a changing operating environment. The first sensor 110 has a sensor profile defined by given calibration parameters and associated with a respective sensor profile identity.

The system 100 further comprises a calibrating sensor 120 that is either a virtual or physical sensor. The calibrating sensor 120 has a sensor profile defined by given calibration parameters and associated with a respective sensor profile identity.

The sensors of the system 100 can be capable of communicating with each other or forming a sensor network as illustrated by an arrow between the first sensor 110 and the calibrating sensor 120. Such communication can be used by the first sensor 110 to detect a calibration condition e.g. from a measurement difference above a given threshold over the measurement values of a proximate other sensor here referred to as the calibrating sensor 120.

In some embodiments, the calibrating sensor 120 and the first sensor 110 can each act as either the first or calibrating sensor, whereas in some other embodiments, the calibrating sensors are hierarchically above the first sensor. For example, the calibrating sensor 120 may have a better accuracy than the first sensor or the calibrating sensor 120 may be more recently and/or more often calibrated than the first sensor 110.

The first sensor 110 and the calibrating sensor 120 are drawn in FIG. 1 to a communicative connection with a processing element such as an edge module 130. The edge module 130 is in some embodiments co-located or within a base station of a cellular network or public land mobile network. The edge module may be operational to control calibration of the first sensor using sensing data telemetry received from the first sensor 110 and measurement data received from the calibrating sensor 120 or more generally data about calibration. That is, the calibrating sensor 120 may have readily produced some calibration related data based on observations made in or at the calibrating sensor 120 using data received directly from the first sensor 110.

The edge module 130 is communicatively connected to a back-end 140 that may be implemented using, for example, a cloud calibration module or one or more server computers. The edge module 130 provides the back-end with aggregated sensing data and telemetry comprising measurements of the first sensor 110 and of the calibrating sensor 120.

The back-end 140 computes or updates and maintains, in an embodiment, a sensor data map based on all received sensor measurements and sensor profiles e.g. in a local or distributed database. The sensor map further comprises in an embodiment locations or relative positions of the different sensors of the system 100. The sensor profile identities can be used to correlate particular sensor profiles with respective sensors.

Having computed or updated the sensor map, the back-end 140 provides the edge module 130 with localized model/map and sensor profile for the first sensor 110. The edge module 130 may then accordingly compute or update a partial sensor data model or physical model map for the first sensor 110 and as further part of the calibration process, issue (new or updated) calibration data to the first sensor 110.

In an embodiment, the data and telemetry from the first sensor 110 are received 310 and compared 320 to the calibration reference data from the calibrating sensor 120 taking into account, for the first sensor, the operational environment, the sensor profile, drift profile and/or error profile. If the comparison results in a finding of invalid data, the process proceeds to step 380 and analyzing of the invalid data in step 390. Unless the invalid data finding was made, the process advances to augmenting 330 first sensor data based on a model for improving the first sensor accuracy. Again, it may an invalid data finding may be made in which case the process continues to step 380. Alternatively, a new calibration configuration may be formed in which case the process advances to step 360 or the process may continue to step 340.

In step 360 it is analyzed whether new calibration configuration improved the first sensor accuracy. If yes, calibration configuration is established 370 and correction parameters are formed including physical location of the first sensor. If no, the process continues to step 340 wherein parameter values are analyzed for optimizing first sensor accuracy and it is searched for a calibration configuration that is expected to improve the first sensor accuracy. If found, the process continues to step 370 and otherwise no improvement is deemed to be possible in step 350.

The forming of the new configuration for the first sensor 110 and/or implementing of the corrective model may be performed at the edge module 120 where data gathering is performed.

The term virtual sensor refers to a computational sensor that emulates or simulates a real sensor based on the data produced by the different sensors and based on knowledge of the environment/operating environment, modelled behavior of the sensors, and also possibly based on artificial intelligence that learns from similar other systems and earlier history within the same system 100. For example, using an outdoors temperature measurement as an example, two relatively proximate sensors would normally produce rather similar values except when one is subjected to particular cooling or heating effect such as a local rain shower or a gap in thick clouds that elsewhere absorb sunshine. However, normally the temperature between two sensors could be simply interpolated. With knowledge of other parameters such as the wind speed and direction and knowledge of temperature development in surrounding other sensors and normal development of temperature as a function of time, it is relatively straightforward to deduce how the temperature distribution will proceed.

Artificial intelligence can be used to determine correlations and potential causalities between across different properties altogether so as to form new cross-parameter models. This may be used to form augmented sensor data to indicate properties beyond actual capabilities of a sensor. The augment sensors will be further described with reference to FIG. 4.

If a physical sensor is close by or has been close (at a certain physical distance) by to the calibrated sensor, the data values from the physical sensor can be utilized together with the current spatio-temporal data available for the region as well as sensor device profiles.

Figure 3:
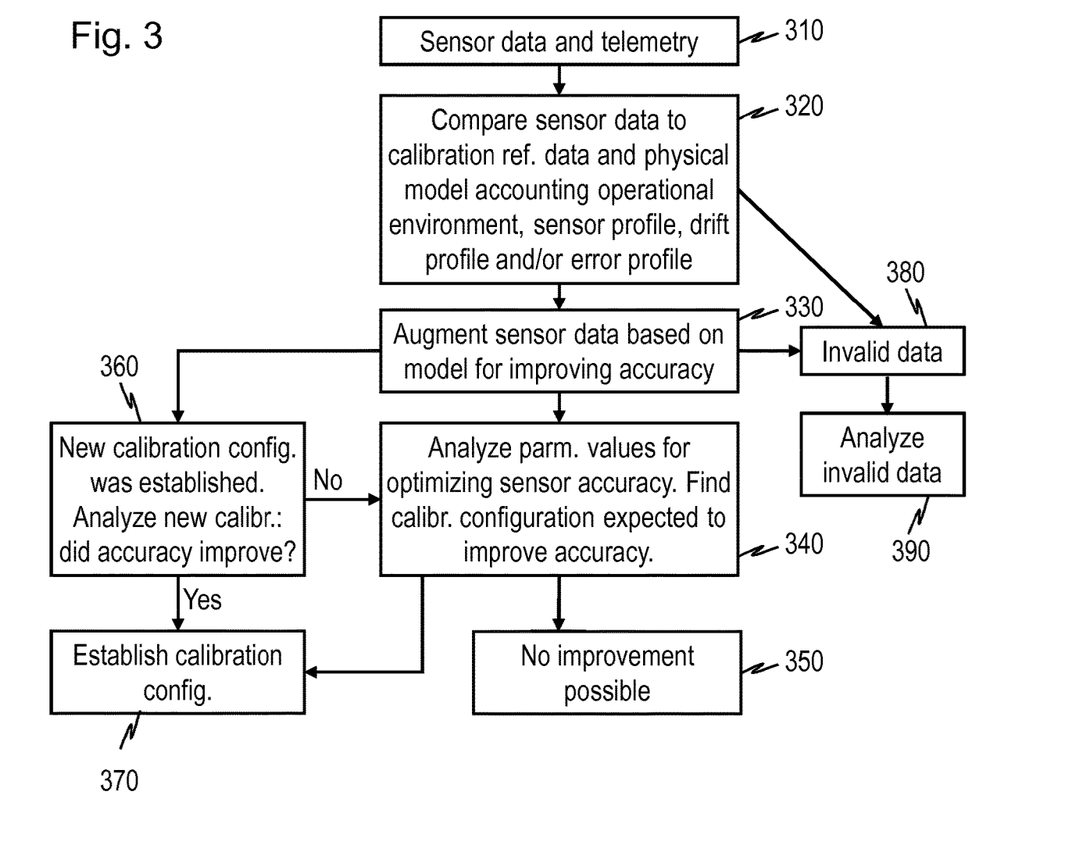
FIG. 3 shows a block diagram of a terminal of FIG. 1.

According to one embodiment exemplified by FIG. 3, if there is no available data within a certain physical distance between the calibrated sensor and a calibrating physical sensor, the system 100 creates a virtual calibrating sensor at the location of the first sensor 110. The data values of the calibrating sensor 120 are extrapolated based on a high quality spatio-temporal map as well as data from any physical sensors in the area in the past.

Figure 4:
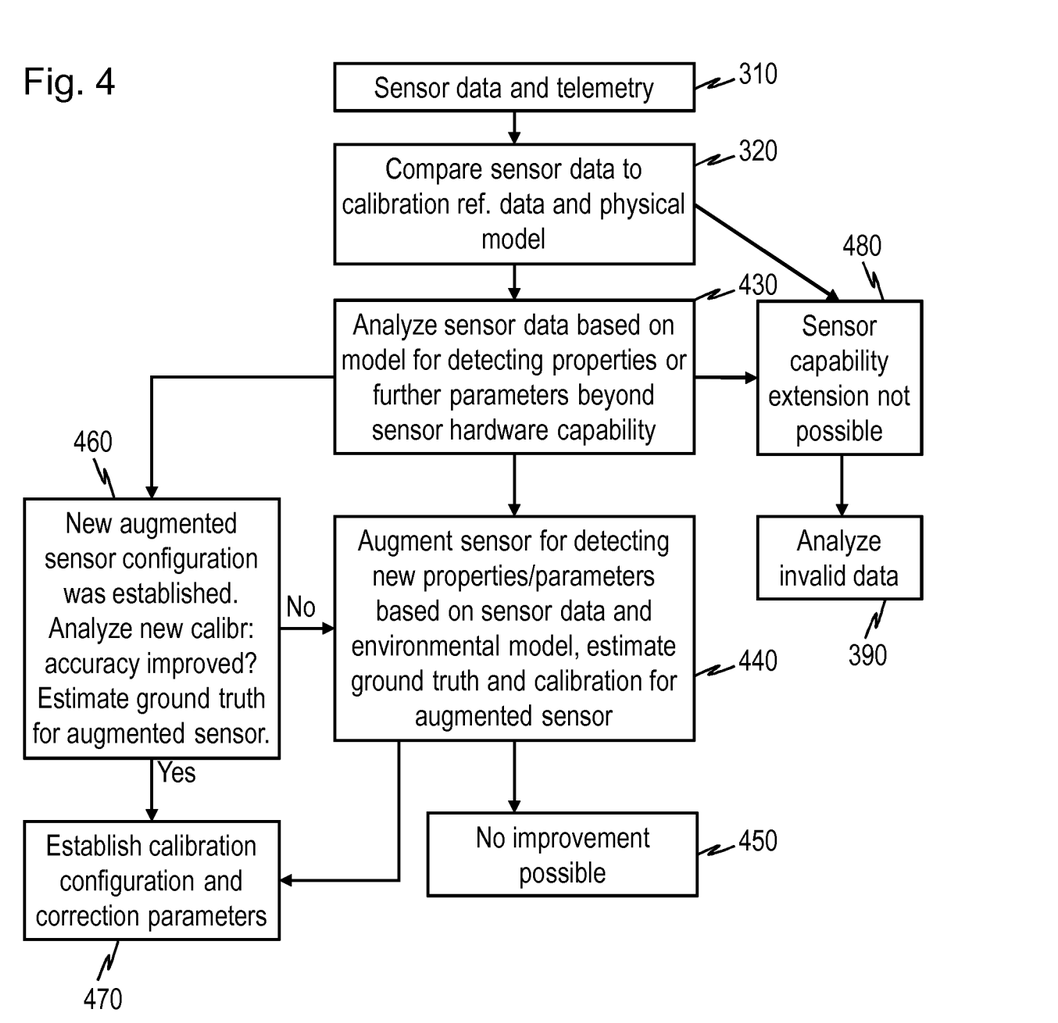
FIG. 4 shows main signaling according to an embodiment of the invention.

FIG. 4 illustrates the process that is capable of extending the hardware sensing capabilities of the sensors through software. A spatio-temporal model and sensor model are utilized to detect properties such as pollutants and environmental properties that are beyond the hardware specifications of the sensor device. The process analyzes 430 the sensor based on the spatio-temporal model for detecting properties or further parameters beyond sensor hardware capability. If the analysing finds that such extension is not possible, the process continues to step 480 and thereafter to analysing 390 invalid data.

If a new augmented sensor configuration has been established since previous calibration run, in step 460 the it is analysed if the new calibration improved accuracy of the first sensor 110 and ground truth is estimated for the augmented first sensor. If no, the process continues to step 440, otherwise to step 470 for establishing calibration configuration and correction parameters based on the new augmented sensor configuration. In step 440, the first sensor is augmented for detecting new properties such as new pollutants based on the first sensor data and the environmental model and ground truth as well as calibration for the augmented sensor are estimated. If an improvement is found possible for the first sensor configuration in step 440, the process continues to step 470 for adoption in use and otherwise to step 450, no improvement possible.

In an embodiment, the ground truth is based on data from more accurate calibrating sensors 120 that are used to identify correlations that are used to detect properties beyond the hardware specifications. The sensor augmentation models may be designed in laboratory environments; however, the system 100 may alternatively or additionally generate such models at runtime based on ground truth data from physical calibrating sensors 120. Augmented sensor configuration can then implemented and established at the physical sensor. The process may evaluate the behaviour of the new augmented sensor configuration based on the available ground truth data.

Figure 2:
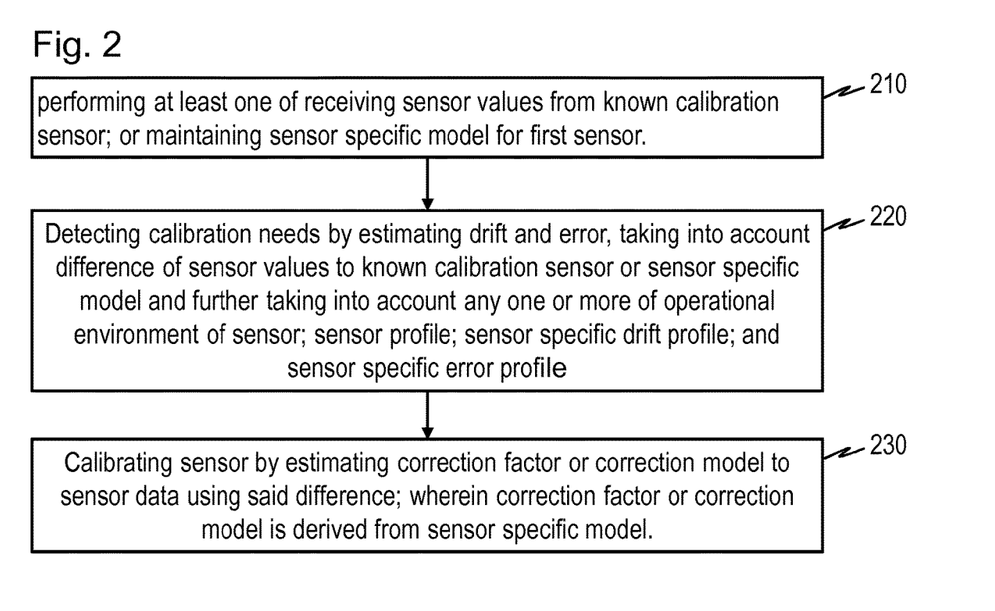
FIG. 2 shows a flowchart according of a process according to an example embodiment.

Returning to a higher level, let us turn into FIG. 2 that shows a flow chart according of a calibration process according to an example embodiment for calibrating a first sensor. The process can be performed by a remote controller i.e. one or more entities such as the edge module 130 or the cloud calibration module 140.

The process comprises receiving 210 sensor data from the first sensor;
- performing at least one of receiving sensor values from a known calibrating sensor; or maintaining a sensor specific model for the first sensor;
- detecting 220 calibration needs by estimating a drift and an error, taking into account a difference of sensor values to a known calibrating sensor or a sensor specific model and further taking into account any one or more of the operational environment of the sensor; the sensor profile; a sensor specific drift profile; and a sensor specific error profile; and
- calibrating 230 the sensor by estimating a correction factor or a correction model to the sensor data using said difference;
- wherein the correction factor or the correction model is derived from the sensor specific model.

In an embodiment, different sensors are hierarchically ranked and a hierarchical model is used to perform the calibrating of the first sensor with the calibrating sensor that is ranked higher in the hierarchical model.

In an embodiment, the method further comprises that.

a spatial model is maintained of one or more properties of a system for measuring which the first sensor is configured; and the spatial model is hierarchically used to perform derived calibration of the first sensor using measurements performed apart of the first sensor and subject to different conditions.

In an embodiment, the spatial model integrates multiple air quality parameters. The spatial model may be connected to a regional air quality model for additional data source or data assimilation.

In an embodiment, a plurality of sensors form groups of sensors communicating with each other. A multi-tier calibration may be performed inside a node and between nodes provide for improving accurate sensing capabilities. The sensor network may include moving sensors configured to transfer the calibration to stationary sensor networks from one or more reference observation sites.

In an embodiment, the calibrating sensor is a mobile sensor, such as a portable sensor, a vehicle mounted sensor or a sensor configured to being transported by a drone.

In an embodiment, the first sensor is a mobile sensor, such as a portable sensor, a vehicle mounted sensor or a sensor configured to being transported by a drone.

In an embodiment, the calibrating sensor is controlled by a remote controller. The remote controller may comprise a server computer. Additionally or alternatively, the remote controller may comprise a distributed functionality. The distributed functionality may be implemented by cloud computing. The remote controller may comprise an edge server positioned at an edge of a computer network.

The remote controller may perform runtime calibration of multiple sensors.

In an embodiment, the calibrating sensor is a virtual sensor based on a model of the sensor data provided by calibrated sensors. The virtual sensor data may be developed based on long-term sensor observables using a determined spatio-temporal data received from a sensor network.

The virtual sensor may be formed automatically, e.g., using artificial intelligence, so that a calibrating sensor can be formed or improved using the virtual sensor for calibrating the first sensor. Alternatively, the virtual sensor may be at least partly manually formed based a choice of real sensors to be used and/or parametrization to be applied with the real sensors.

In an embodiment, proxy variables are incorporated from comprehensive observations and expanded via a network of sensors.

For example, $SO_2$, solar radiation and particulate matter may provide data on gas phase sulfuric acid concentration. New proxies may be developed via artificial intelligence and/or other data mining techniques.

In an embodiment, a calibrated sensor is extended to an augmented virtual sensor that is configured to detect environmental properties beyond hardware specification of used at least one first sensor. The extending of the calibrated sensor to the augmented virtual sensor may use the calibration model. The augmented virtual sensor may further use an environmental model. The environmental model may be produced by the remote controller.

Figure 5:
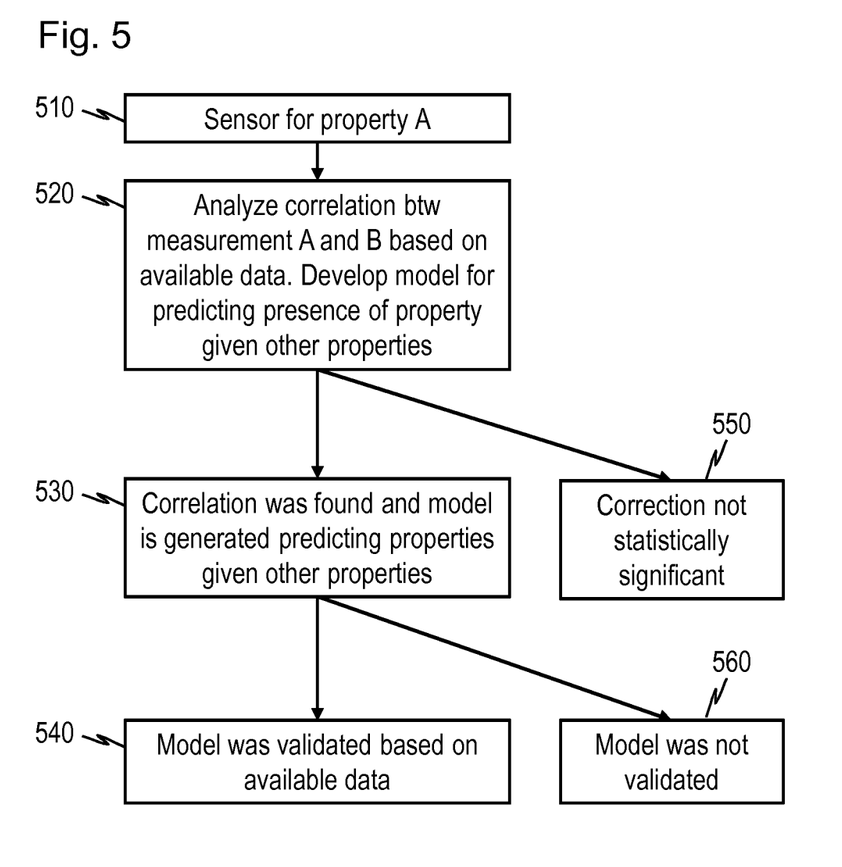
FIG. 5 shows main signaling according to another embodiment of the invention.

FIG. 5 further exemplifies the analyzing of (potentially weak) correlations between measured properties. The method may be generalized to any number of properties given that sufficient data is available. State of the art machine learning techniques can be utilized in the prediction of properties that are beyond the original hardware specifications. One sensor measures property A. 510. A correlation between the measurements A and B (by another sensor) is analyzed based on available data and a model is developed for predicting presence of property given other properties, 520. If a correlation was found, in step 530 a model is generated for predicting properties given other properties; otherwise the process ends. As an exception, a correlation may be found, but not seen statistically significant, 550, so the process is terminated. If the model was generated it is further attempted in step 530 to validated the model. If the model was validated based on the available data, the process continues to step 540 and the model is adopted, otherwise the model was not validated and will not be adopted, 560.

According to an embodiment, a model of one natural system is parameterized to suit into another natural system. For example, a pollutant gas model of one city or country may be adopted to another city or country.

Figure 6:
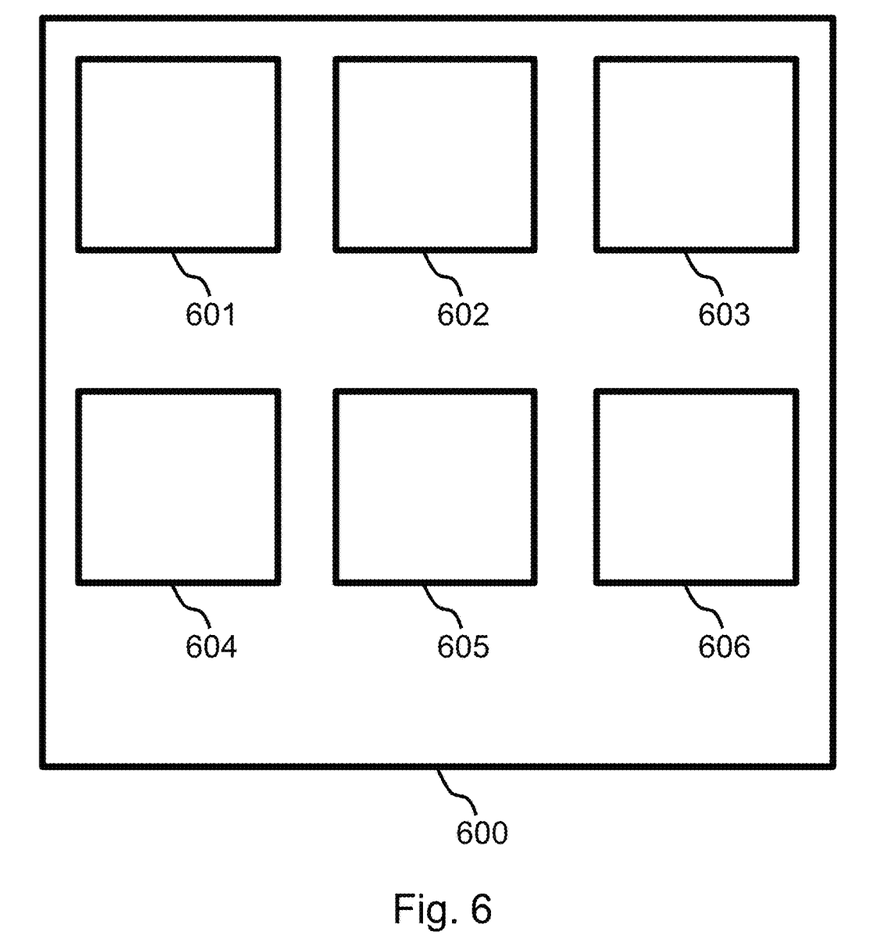
FIG. 6 shows an apparatus according to an embodiment of the invention.

FIG. 6 illustrates an apparatus 600 for calibrating a first sensor in a changing operating environment, the apparatus comprising:

means for receiving sensor data from the first sensor 601;

means for receiving sensor values from a known calibrating sensor 602;

means for obtaining a localized sensor map and profile for the first sensor 603:

means for maintaining a sensor specific model for the first sensor using the localized sensor map 604;

means for detecting calibration needs by estimating a drift and error of the sensor data, taking into account a difference between the sensor data from the first sensor and the sensor values from the calibrating sensor 605; and means for calibrating the sensor by estimating a correction factor or a correction model to the sensor data using said difference and the sensor specific model 606;

wherein the calibrating sensor is a virtual sensor based on a model of sensor data provided by one or more calibrated sensors, and wherein the calibrating sensor is ranked higher than the first sensor in a hierarchical model wherein the first sensor, the calibrating sensor and additional sensors form groups of sensors communicating with each other via a sensor network, and wherein calibration is performed inside a node of the sensor network and between nodes of the sensor network to provide for improving accurate sensing capabilities.

The labeled representations of items within FIG. 6 do not illustrate any relative size or placement of the various representations. While certain means are shown as separate labeled representations, this does not mean that the means are necessarily separate objects and may themselves be comprised in a single entity.

Figure 7:
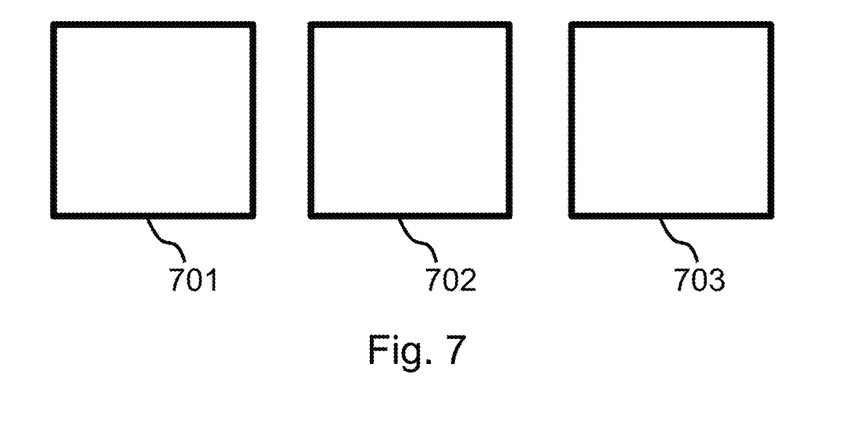
FIG. 7 shows nodes of a sensor network and a remote controller 703.

FIG. 7 illustrates nodes 701 and 702 of a sensor network and a remote controller 703. The labeled representations of items within FIG. 7 do not illustrate any relative size or placement of the various representations.

The processing in the system can be distributed e.g. such that remote entity or entities such as the remote controller process larger data sets and only sensor readings and necessary local processing are performed at the sensor. Alternatively, the processing can be distributed in other ways per implementation. For example, a virtual network entity may perform processing.

In an embodiment, the calibration of the first sensor is dynamically adapted. The adapting can be implemented, e.g., by changing parameters, position or orientation of an elementary sensor. The adapting can further or alternatively be implemented by adapting a model with which the correction factor or correction model is derived.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented in the foregoing, but that it can be implemented in other embodiments using equivalent means or in different combinations of embodiments without deviating from the characteristics of the invention.

Furthermore, some of the features of the afore-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising calibrating a first sensor in a changing operating environment in a calibration process that comprises:
   receiving sensor data from the first sensor;
   receiving sensor values from a known calibrating sensor;
   obtaining a localized sensor map and profile for the first sensor:
   maintaining a sensor specific model for the first sensor using the localized sensor map and profile;
   detecting calibration needs by estimating a drift and error of the sensor data, taking into account a difference between the sensor data from the first sensor and the sensor values from the calibrating sensor; and
   estimating a correction factor or a correction model to the sensor data using said difference and the sensor specific model; and
   using the estimated correction factor or correction model for calibrating the first sensor;
   wherein the calibrating sensor is a virtual sensor based on a model of sensor data provided by one or more calibrated sensors,
   wherein the calibrating sensor is ranked higher than the first sensor in a hierarchical model,
   wherein the first sensor, the calibrating sensor and additional sensors form groups of sensors communicating with each other via a sensor network, and
   wherein calibration is performed inside a node of the sensor network and between nodes of the sensor network to provide for improving accurate sensing capabilities.

2. The method of claim 1, wherein the calibrating sensor ranked higher in the hierarchical model is used to perform the calibrating of the first sensor.

3. The method of claim 1, wherein:
   the first sensor is configured for measuring one or more properties of a chosen system; and
   a spatial model of the one or more properties is used to perform a derived calibration of the first sensor using measurements performed apart from the first sensor and subject to different conditions,
   wherein the one or more properties comprise multiple air quality parameters, and
   wherein the spatial model includes additional data from a regional air quality model.

4. The method of claim 1, wherein the groups of sensors include stationary sensors and mobile sensors configured to transfer sensor data to the stationary sensor.

5. The method of claim 1, wherein the detecting calibration needs further takes into account the sensor specific model.

6. The method of claim 1, wherein the detecting calibration needs further takes into account an operational environment of the first sensor.

7. The method of claim 1, wherein the detecting calibration needs further takes into account a sensor profile of the first sensor.

8. The method of claim 1, wherein the detecting calibration needs further takes into account a sensor specific drift profile of the first sensor.

9. The method of claim 1, wherein the detecting calibration needs further takes into account a sensor specific error profile of the first sensor.

10. The method of claim 1, wherein the calibrating sensor is controlled by a remote controller.

11. An apparatus for calibrating a first sensor in a changing operating environment, the apparatus comprising:
    means for receiving sensor data from the first sensor;
    means for receiving sensor values from a known calibrating sensor;
    means for obtaining a localized sensor map and profile for the first sensor:
    means for maintaining a sensor specific model for the first sensor using the localized sensor map;
    means for detecting calibration needs by estimating a drift and error of the sensor data, taking into account a difference between the sensor data from the first sensor and the sensor values from the calibrating sensor; and
    means for calibrating the sensor by estimating a correction factor or a correction model to the sensor data using said difference and the sensor specific model;
    wherein the calibrating sensor is a virtual sensor based on a model of sensor data provided by one or more calibrated sensors, and
    wherein the calibrating sensor is ranked higher than the first sensor in a hierarchical model,
    wherein the first sensor, the calibrating sensor and additional sensors form groups of sensors communicating with each other via a sensor network, and
    wherein calibration is performed inside a node of the sensor network and between nodes of the sensor network to provide for improving accurate sensing capabilities.

12. The method of claim 1, wherein the calibrating sensor is further based on knowledge of the operating environment and modelled behavior of the one or more calibrated sensors.

13. A method comprising calibrating a first sensor in a changing operating environment in a calibration process that comprises:
    receiving sensor data from the first sensor;
    receiving sensor values from a known calibrating sensor;
    obtaining a localized sensor map and profile for the first sensor:
    maintaining a sensor specific model for the first sensor using the localized sensor map and profile;
    detecting calibration needs by estimating a drift and error of the sensor data, taking into account a difference between the sensor data from the first sensor and the sensor values from the calibrating sensor; and
estimating a correction factor or a correction model to the sensor data using said difference and the sensor specific model; and
using the estimated correction factor or correction model for calibrating the first sensor;
wherein the calibrating sensor is a virtual sensor based on a model of sensor data provided by one or more calibrated sensors,
wherein the calibrating sensor is ranked higher than the first sensor in a hierarchical model, and
wherein the calibrating sensor is controlled by a remote controller.

14. The method of claim 13, wherein the calibrating sensor ranked higher in the hierarchical model is used to perform the calibrating of the first sensor.

15. The method of claim 13, wherein:
the first sensor is configured for measuring one or more properties of a chosen system; and
a spatial model of the one or more properties is used to perform a derived calibration of the first sensor using measurements performed apart from the first sensor and subject to different conditions, and
wherein the one or more properties comprise multiple air quality parameters, and
wherein the spatial model includes additional data from a regional air quality model.

16. The method of claim 13, wherein the first sensor, the calibrating sensor and additional sensors form groups of sensors communicating with each other via a sensor network, and
wherein calibration is performed inside a node of the sensor network and between nodes of the sensor network to provide for improving accurate sensing capabilities.

17. An apparatus for calibrating a first sensor in a changing operating environment, the apparatus comprising:
means for receiving sensor data from the first sensor;
means for receiving sensor values from a known calibrating sensor;
means for obtaining a localized sensor map and profile for the first sensor:
means for maintaining a sensor specific model for the first sensor using the localized sensor map;
means for detecting calibration needs by estimating a drift and error of the sensor data, taking into account a difference between the sensor data from the first sensor and the sensor values from the calibrating sensor; and
means for calibrating the sensor by estimating a correction factor or a correction model to the sensor data using said difference and the sensor specific model;
wherein the calibrating sensor is a virtual sensor based on a model of sensor data provided by one or more calibrated sensors,
wherein the calibrating sensor is ranked higher than the first sensor in a hierarchical model, and
wherein the calibrating sensor is controlled by a remote controller.

18. The apparatus of claim 17, wherein the calibrating sensor ranked higher in the hierarchical model is used to perform the calibrating of the first sensor.

19. The apparatus of claim 17, wherein:
the first sensor is configured for measuring one or more properties of a chosen system; and
a spatial model of the one or more properties is used to perform a derived calibration of the first sensor using measurements performed apart from the first sensor and subject to different conditions,
wherein the one or more properties comprise multiple air quality parameters, and
wherein the spatial model includes additional data from a regional air quality model.

20. The apparatus of claim 17, wherein the first sensor, the calibrating sensor and additional sensors form groups of sensors communicating with each other via a sensor network, and
wherein calibration is performed inside a node of the sensor network and between nodes of the sensor network to provide for improving accurate sensing capabilities.

* * * * *